Figure 1:
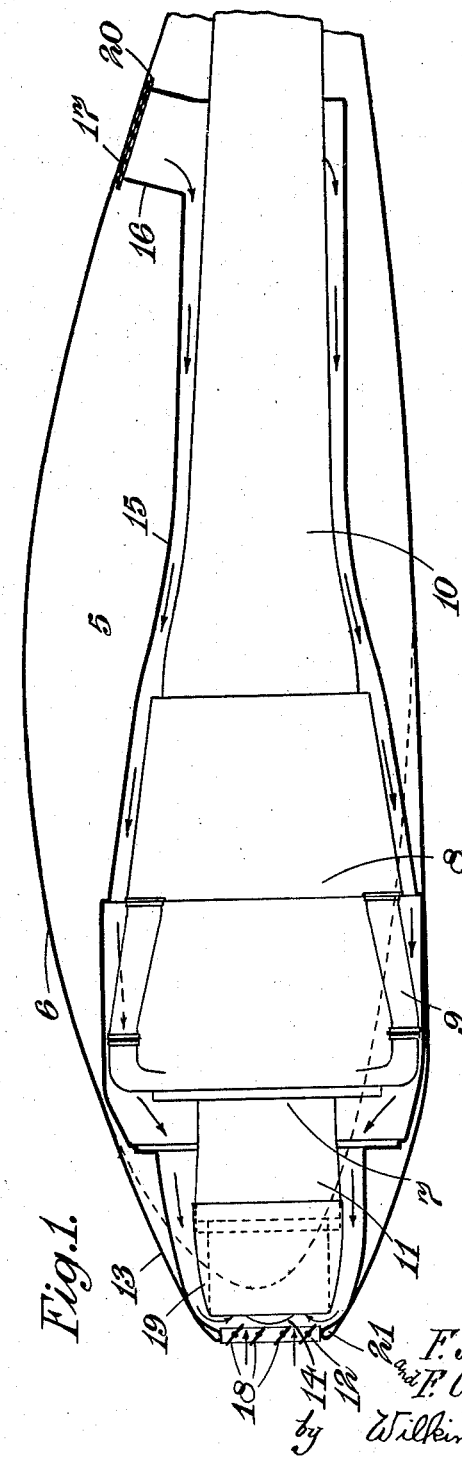

May 16, 1950     F. M. OWNER ET AL     2,508,288
GAS TURBINE POWER PLANT FOR AIRCRAFT

Filed Dec. 19, 1945     3 Sheets-Sheet 1

Inventors
F. M. Owner
and F. C. I. Marchant
by Wilkinson & Mawhinney
Attorneys

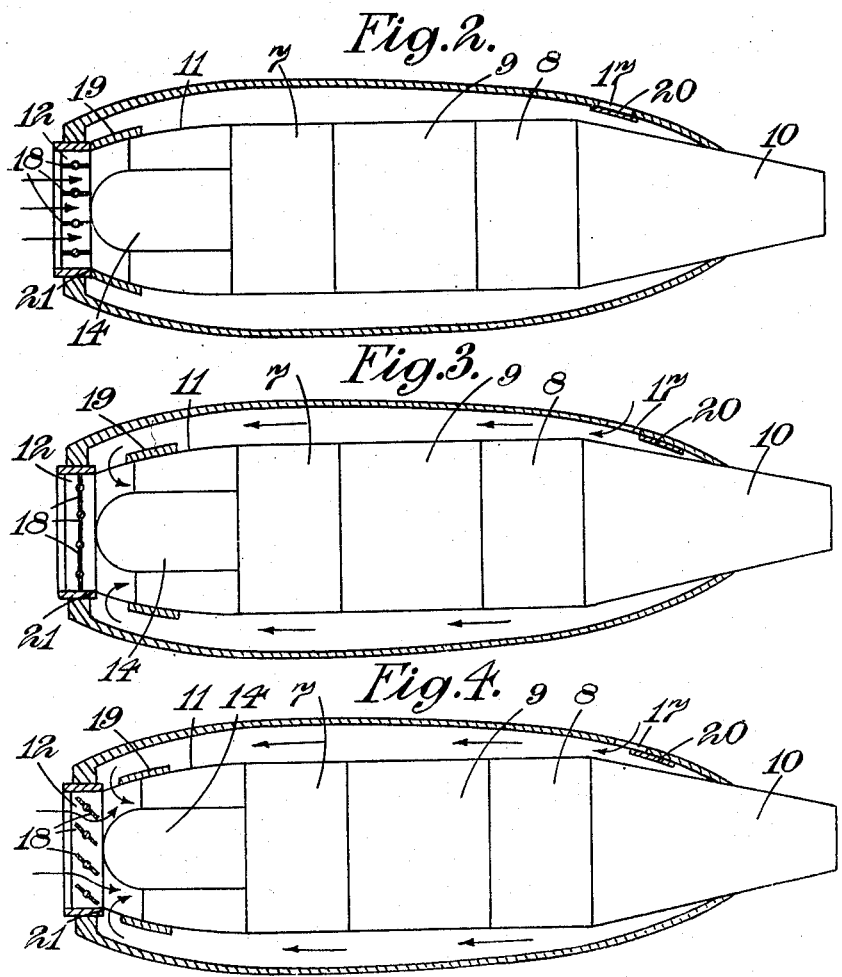

May 16, 1950 F. M. OWNER ET AL 2,508,288
GAS TURBINE POWER PLANT FOR AIRCRAFT
Filed Dec. 19, 1945 3 Sheets-Sheet 3
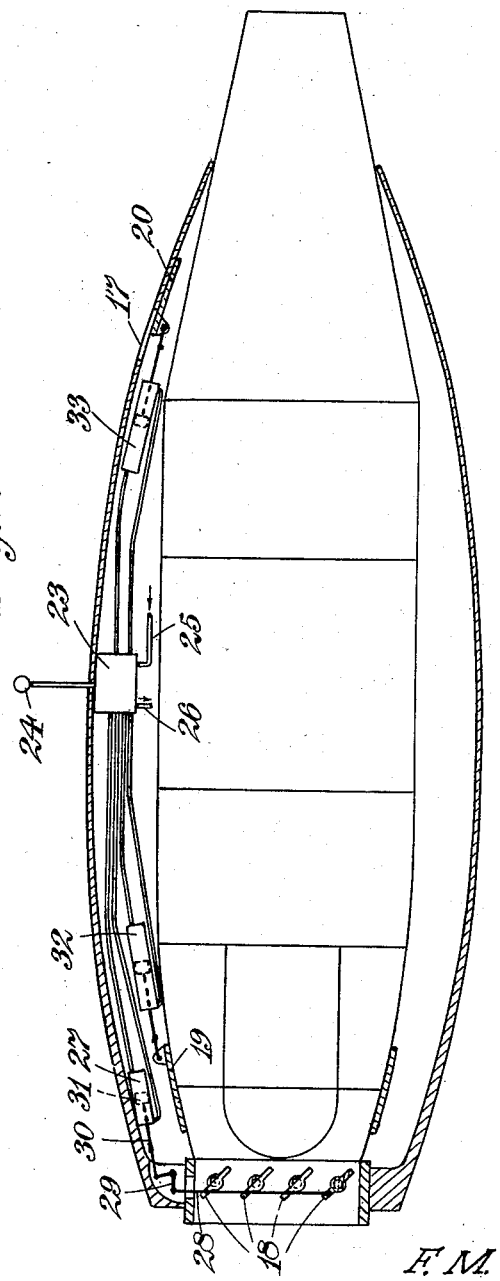
INVENTORS
F. M. OWNER &
F. C. I. MARCHANT
by Wilkinson Mawhinney
Attorneys Patented May 16, 1950

2,508,288

UNITED STATES PATENT OFFICE 2,508,288

GAS TURBINE POWER PLANT FOR AIRCRAFT

Frank Morgan Owner and Francis Charles Ivor Marchant, Bristol, England, assignors to The Bristol Aeroplane Company Limited, Bristol, England, a British company Application December 19, 1945, Serial No. 635,914 In Great Britain December 8, 1944

Section 1, Public Law 690, August 8, 1946 Patent expires December 8, 1964

5 Claims. (Cl. 244—15)

This invention concerns improvements in or relating to gas-turbine power-plants for aircraft and has for its object to provide a plurality of combustion-air supplies for the plant, said supplies being selectable to suit the conditions under which the power-plant is operating.

According to this invention a gas-turbine power-plant has a single tubular intake-duct which receives air from two sources, the air from one source entering the open end of the duct in the general direction of the longitudinal axis of the duct, and the air from the other source entering the duct by a radially inward movement around the peripheral edge of the open end of the duct.

Preferably the air flowing around the peripheral edge of the intake has been previously heated in passing over the power-plant in contact therewith. The source of supply of said air may be an opening disposed in the upper surface of the wing of an aeroplane and toward the trailing edge thereof. Preferably said air passes from the upper-wing-surface opening to the air intake along a space between the power-plant and a shell enveloping said power-plant.

A specific embodiment of the present invention will now be described by way of example with reference to the accompanying drawings whereof:

Figure 1 is a longitudinal sectional view of the wing of an aeroplane showing a gas-turbine power-plant in accordance with the present invention mounted therein, Figure 2 is a diagrammatic view of the power-plant showing the normal air intake open to supply the power-plant, Figure 3 is a similar view showing the power-plant when being supplied with heated air, Figure 4 is a similar view showing the power-plant when being supplied in part with heated air and in part with the air from the normal air source, and Figure 5 is a diagrammatic view similar to Figure 4 and showing the regulating means for selecting the air supplies to the engine.

Referring to Figure 1: the power-plant is generally indicated by the reference numeral 5 said power-plant being carried within the wing 6 so that the longitudinal axis of the power-plant extends chordwise of the wing. The power-plant 5 generally comprises a compressor 7, a turbine 8, a plurality of combustion chambers 9 and an exhaust-gas duct 10. The compressor, combustion chambers, gas-turbine and exhaust-gas duct are disposed one behind the other in the order mentioned. Air admitted to the power-plant 5 by an intake duct generally indicated by the reference numeral 11 is compressed in the compressor 7 and passed to the combustion chambers 9, in which it is heated, the products of combustion then passing to the turbine 8 and thence along the exhaust gas duct 10 from which they are expelled at the trailing edge of the wing 6. The power-plant 5 is supported by a mounting (not shown) from the spars and ribs of the wing.

The intake duct 11 to the compressor 7 is of circular cross-section with its open end disposed behind and near to an opening 12 which is formed in a fairing 13 disposed at the leading-edge of the wing. Air may enter the opening 12 and pass along the intake duct 11 to the compressor.

The rotor of the compressor 7 carries a streamlined boss 14 which lies concentrically within the intake duct and extends beyond the open end thereof so that the mouth of the intake-duct is constituted by the annular space between the peripheral edge of the intake-duct and the boss. It is important that for the efficient operation of the compressor 7 the distribution of air be uniform over the mouth of the intake duct and this is assured by forming the opening 12 circular and concentric with the intake-duct 11.

The provision of an air supply from a leading edge opening is best in most circumstances but it has certain disadvantages, the chief being that under certain conditions the edge of the opening 12 may become fringed with a layer of ice portions of which are liable to break off and be carried into the compressor. The icing-up of the opening 12 will most commonly occur when the aeroplane is flying at high altitudes and it is therefore desirable that an alternative source of air supply be provided for use under such conditions and that this air be heated before admission to the compressor. To this end the power-plant as a whole is enveloped by a shell 15 which generally conforms to the configuration of the power-plant and which extends from the opening 12 in the fairing 13 to some convenient point along the exhaust-gas duct 10. The shell 15 is spaced from the members of the power-plant so as to constitute an air passage between them whilst the end of the shell located towards the trailing edge of the wing is formed with a lateral extension 16 which is directed towards the upper surface of the wing. A grilled aperture 17 is provided in the upper surface of the wing adjacent the lateral extension 16 of the shell 15 so that said extension may be placed in communication with the atmosphere. By way of the grilled aperture air from outside the wing 6 may pass into the passageway between the shell 15 and the power-plant and this air from outside the wing will become heated in passing over the outer surface of the exhaust duct 10, the turbine 8 and the combustion chamber 9. The air which has thus been heated will flow along the outside of the circular intake-duct 11 to the peripheral edge at the open end thereof (as shown in Figure 1) and uniformly around this edge into the mouth of the intake-duct. A uniform distribution of air to the air intake is therefore assured whether the air passes to the compressor 7 by way of opening 12 or after flowing over the power-plant within the shell 15.

Means is provided to select the source from which the power-plant obtains its air supply. Said means comprises a plurality of louvre-slats 18 disposed within the opening 12, a sleeve 19 associated with the intake duct 11 and a grilled plate 20. The louvre-slats 18 are pivotally mounted so that the opening 12 may be closed and opened as desired. The sleeve 19 is capable of being moved axially of the intake duct 11 towards and away from the leading edge 21 of the fairing 13 which defines the opening 12. Moreover, the grilled plate 20 may be moved relatively to the grilled openings 17 so that the openings coincide or so that the openings are closed. When the sleeve 19 is in its advanced position (Figure 2) it engages the leading edge 21 of the fairing 13 and prevents communication between the air passage within the shell 15 and the intake duct 11. The louvre-slats 18, the sleeve 19 and the plate 20 are interconnected and operated by a cockpit control which is capable of being set either to a position in which the louvre-slats 18 are open and the sleeve 19 closes the peripheral opening to the intake-duct 11 and at the same time the plate 20 is set to prevent communication between the lateral extension 16 of the shell 15 and the air outside the wing 6 or to a position in which the louvre-slats 18 are closed (Figure 3) and the sleeve 19 is withdrawn so that the air is then free to pass around the peripheral opening into the air-intake 11 from the upper surface of the wing, the plate 20 being correspondingly set so that the grilled opening will permit air to enter the shell 15 by the lateral extension 16. If desired intermediate settings of the control might be arranged to permit a proportion of the air supply to enter the intake 11 by way of openings 17 and opening 12 such an arrangement being shown in Figure 4.

The preferred means for selecting the source from which the power plant obtains its air supply is shown diagrammatically in Figure 5 and comprises a valve member 23 which is manually controlled as by the lever 24. Pressure oil is supplied to the member 23 by pipe 25 and oil is drained from the member by pipe 26. A hydraulic jack 27 is provided to adjust the louvres 18, the latter being connected together by a rod 28 which is attached to one arm of a bell crank lever 29 the other arm of which is connected with the rod 30 carrying ram 31 of the jack 27. The sleeve 19 is similarly connected with the ram of a jack 32. Finally, the plate 20 is connected to the jack 33. Each of the jacks 27, 32 and 33 are of the double-acting type. Each jack is connected with the valve member 23 by pipe lines so that the jack may be moved in either sense as required.

The valve member 23 is so designed that when the lever 24 is adjusted in one direction oil under pressure will pass from pipe 25 to the hydraulic jacks 27, 32 and 33 so as to open the louvres 18, close the opening 17 and advance the sleeve 19. When the lever 24 is moved in the opposite direction the valve member 23 is set to allow oil under pressure from the pipe 25 to pass to the jacks 27, 32, 33 so that the louvres 18 are closed, the sleeve 19 is retracted from its forward position and the plate 20 is moved to its open position. The lever 24 in its normal position closes the valve member 23. Accordingly, if the lever 24 is returned to its normal position during adjustment of the louvres, the sleeve of the plate will have been adjusted to an intermediate setting.

Although the provision of an alternative opening on the upper surface of the wing and towards the trailing edge thereof (as at 17) is primarily intended to reduce the hazards associated with icing conditions, it also has the important advantage of maintaining a laminar flow of air over the wing surface. The quantity of air required for the operation of a gas-turbine power-plant being great its effect in maintaining a laminar flow is considerable.

Another danger associated with gas-turbine power-plants having an air-intake 12 on the leading edge of the wing which communicates directly with the compressor is that during ground-running of the power-plant stones may be lifted from the ground and enter the compressor. This is particularly likely to occur in jet propelled aircraft since, as is well known, the elimination of the airscrew enables the height of the undercarriage to be reduced so that, in effect, the power plant is brought nearer to the ground. With the construction described the manual control in the cockpit may be set during ground-running to close the louvre-slats 18 and permit air to pass to the power-plant only by way of the upper wing-openings 17. The disposition of the latter makes it unlikely that stones or other foreign bodies can enter the compressor.

When a gas-turbine power-plant is enclosed within the wing as in the construction described above, there is a risk that if the fuel tanks, which are normally carried in the wing, are ruptured the escaping fuel on coming into contact with the exhaust-gas duct will catch fire. When the fuel tanks are located as indicated the shell 15 may be extended rearwardly beyond the lateral portion 16 thereof to the trailing edge of the wing so that the entire power-plant and exhaust gas duct is surrounded thereby within the wing. In such an arrangement the power-plant shell will materially reduce this danger since it is spaced from the power-plant by an insulating layer of air and its temperature will therefore be considerably lower than any part of the power-plant, including the exhaust-gas duct.

It is to be understood that although a shell has been described which conforms to the configuration of the power-plant, this need not be so. For instance, the power-plant may be mounted within a sealed compartment defined by the upper and lower surfaces of the wing and a pair of spaced plates lying chordwise one on each side of the power-plant. Air admitted to the compartment through an opening on the upper surface of the wing will be conveyed through the compartment to the air intake of the power-plant. The admission of this air to the power-plant is regulated by the slidable grille referred to above.

We claim:

1. The combination of a gas turbine engine having a compressor, a casing enveloping the engine and spaced therefrom, said casing having a pair of openings giving into the interior of the casing, a first opening being adjacent the intake to the compressor of the engine and a second opening being disposed remotely thereof and adjacent a part of the engine which operates at high temperature, means for closing each of said openings, means for bridging the space between the compressor and the casing to form a duct leading from the first opening to the intake and means interconnecting the opening-closure means and said bridging means so that as the first opening is opened the second opening is closed and the bridging duct is formed, said bridging means being movable between bridging and non-bridging positions.

2. An airplane comprising a wing, a gas turbine engine having a compressor buried in the wing and spaced from the skin surfaces thereof, said wing having a leading-edge opening adjacent the air intake to the compressor of the engine and a trailing-edge opening adjacent a part of the engine which operates at high temperature, means for closing each of said openings, means for bridging the space between the compressor and the wing surfaces to form a duct leading from the leading-edge opening to the intake and means interconnecting the opening-closure means and said bridging means so that as the leading-edge opening is opened the trailing-edge opening is closed and the bridging duct is formed, said bridging means being movable between bridging and non-bridging positions.

3. An airplane comprising a wing, a gas turbine engine having a compressor buried in the wing and spaced from the skin surfaces thereof, said wing having a leading-edge opening adjacent the air intake to the compressor of the engine and a trailing-edge opening in the upper wing surface adjacent a part of the engine which operates at high temperature, means for closing each of said openings, means for bridging the space between the compressor and the wing surfaces to form a duct leading from the leading-edge opening to the intake and means interconnecting the opening-closure means and said bridging means so that as the leading-edge opening is opened the trailing-edge opening is closed and the bridging duct is formed, said bridging means being movable between bridging and non-bridging positions.

4. An airplane according to claim 2 wherein the compressor of the gas turbine engine is of the axial-flow type and the bridging means comprises a sleeve which is movable axially of the compressor to form an extension of the stator casing of the compressor.

5. An airplane comprising a wing, a gas turbine engine having an axial-flow compressor and a jet pipe buried in the wing and spaced from the skin surfaces thereof, said wing having a leading-edge opening adjacent the air intake to said compressor and a trailing-edge opening in the upper wing surface adjacent the jet pipe of the engine, a shutter to close the trailing-edge opening, louvres to close the leading-edge opening, a sleeve movable axially of the compressor to form an extension duct of the stator casing of the compressor leading from the leading-edge opening to the compressor intake and means interconnecting the louvres, sleeve and shutter so that as the louvres are opened the shutter is closed and the sleeve is moved to form said duct-extension of the compressor.

FRANK MORGAN OWNER.
FRANCIS CHARLES IVOR MARCHANT.

REFERENCES CITED

The following references are of record in the file of this patent:

UNITED STATES PATENTS

| Number | Name | Date |
| --- | --- | --- |
| 1,513,241 | Harding | Oct. 28, 1924 |
| 2,103,466 | Klemm | Dec. 28, 1937 |
| 2,348,253 | Griswold | May 9, 1944 |

FOREIGN PATENTS

| Number | Country | Date |
| --- | --- | --- |
| 12,735 | Great Britain | May 31, 1906 |
| 433,631 | Great Britain | Aug. 19, 1935 |
| 479,598 | Great Britain | Feb. 7, 1938 |
| 484,405 | Great Britain | May 2, 1938 |
| 486,759 | Great Britain | June 2, 1938 |